US005460001A

United States Patent [19]

Kato et al.

[11] Patent Number: 5,460,001

[45] Date of Patent: Oct. 24, 1995

[54] FLOW CONTROL SYSTEM

[75] Inventors: Hideyo Kato, Ibaraki; Masami Ochiai, Atsugi, both of Japan

[73] Assignee: Hitachi Construction Machinery Co., Ltd., Tokyo, Japan

[21] Appl. No.: 336,667

[22] Filed: Nov. 7, 1994

[30] Foreign Application Priority Data

Nov. 8, 1993 [JP] Japan .................................... 5-278365

[51] Int. Cl.[6] ............................. F16D 31/02; F15B 11/08

[52] U.S. Cl. ................................ 60/426; 60/452; 60/494; 91/518; 91/446

[58] Field of Search ............................. 91/511, 517, 518, 91/444, 446, 447, 448; 60/426, 452, 494

[56] References Cited

U.S. PATENT DOCUMENTS

| | | | |
|---|---|---|---|
| 4,401,009 | 8/1983 | Zeuner et al. | 91/446 X |
| 4,523,430 | 6/1985 | Masuda | 60/452 X |
| 4,938,023 | 7/1990 | Yoshino | 60/452 X |
| 5,101,629 | 4/1992 | Sugiyama et al. | 60/494 X |
| 5,271,227 | 12/1993 | Akiyama et al. | 91/446 X |
| 5,347,811 | 9/1994 | Hasegawa et al. | 91/446 X |

FOREIGN PATENT DOCUMENTS

| | | |
|---|---|---|
| 0366815 | 5/1990 | European Pat. Off. . |
| 0439621 | 8/1991 | European Pat. Off. . |
| 0449802 | 8/1991 | European Pat. Off. . |
| 0586214 | 3/1994 | European Pat. Off. . |
| WO9000683 | 1/1990 | WIPO . |
| WO9117363 | 11/1991 | WIPO . |
| WO9204505 | 3/1992 | WIPO . |

*Primary Examiner*—Edward K. Look
*Assistant Examiner*—Hoang Nguyen
*Attorney, Agent, or Firm*—Evenson, McKeown, Edwards & Lenahan

[57] ABSTRACT

A flow control system is arranged in a hydraulic circuit provided with a variable displacement hydraulic pump, plural actuators and a pump controller. The pump controller controls the displacement of the pump so that a delivery pressure becomes higher by a predetermined value than a maximum load pressure of the plural actuators, whereby the flow rate of pressure oil to the actuators is controlled. The system includes plural valve units connected between the pump and the actuators. Each valve unit has an operating and correcting variable restrictors. The system also includes pressure compensation valves, which are each arranged on an upstream side of a restrictor group consisting of the operating and correcting variable restrictors. The opening of the pressure compensation valve is independently set by an opening drive force set based on a downstream pressure of the restrictor group, an opening drive force set by a pressure-difference setting device and a closing drive force set based on an upstream pressure of the restrictor group so that the upstream pressure becomes higher by a predetermined pressure than the downstream pressure of the restrictor group.

10 Claims, 6 Drawing Sheets

$x_i$ : Opening area ratio $\left(=\frac{B_i}{A_i}\right)$ $\Delta P_{vi}$ : Pressure difference across the operating restriction unit $\Delta P_{LS}$ : Compensation to the pressure difference by the pressure compensation unit $A_i$ : Opening area of the operating variable restriction unit $B_i$ : Opening area of the correcting variable restriction unit

FLOW CONTROL SYSTEM

BACKGROUND OF THE INVENTION a) Field of the Invention

This invention relates to a flow control system suitable for use in controlling the rate of a flow through a hydraulic circuit for performing load sensing control, for example, through a hydraulic circuit for driving actuators of a hydraulic work vehicle.

b) Description of the Related Art

A hydraulic control system for an apparatus with plural actuators driven by an oil pressure at the same time, for example, for a work vehicle such as a hydraulic excavator is equipped with a hydraulic pump, plural actuators driven by pressure oil fed from the hydraulic pump, and plural valve devices for controlling the flow rates of pressure oil to be fed from the hydraulic pump to the respective actuators. Known as hydraulic control systems of this type include, for example, load sensing control for controlling the delivery pressure of a hydraulic pump in response to a load pressure. One example of the load sensing control is disclosed in WO 90/00683. According to this conventional technology, there is provided pump control means for controlling the displacement of a hydraulic pump so that the delivery pressure of the hydraulic pump becomes higher by a predetermined value than a maximum load pressure to plural actuators. This pump control means is constructed of flow rate control valves provided with variable restrictors for changing the openings of plural valve devices in accordance with control signals from a control lever device, respectively, and pressure compensation valves (auxiliary valves) arranged on upper sides and in series with the respective variable restrictors to control pressure differences across the variable restrictors, respectively. By controlling the pressure differences across the respective variable restrictors with the corresponding pressure compensation valves, it has made it possible, upon combined operation to drive two or more of the actuators, to surely feed pressure oil to all the driven actuators irrespective of the levels of loads to the driven actuators so that the two or more of the actuators can be driven at the same time.

To ensure smooth drive of all the actuators to be driven in parallel in such a hydraulic circuit as described above, it is necessary to constantly feed a hydraulic pressure sufficient to drive one of the actuators, to which a greatest load is applied. To this end, a control method, that is, the above-described load sensing control is adopted. This load sensing control means the control method that in a hydraulic circuit with actuators driven in parallel, the maximum load pressure out of load pressures under which the actuators are driven, respectively, in parallel is detected and the delivery capacity of a hydraulic pump is controlled to make the delivery pressure of the hydraulic pump higher by a predetermined value than the maximum load pressure. The adoption of this control method has made it possible not only to supply a sufficient hydraulic pressure to each actuator but also to allow the hydraulic pump to always feed a hydraulic pressure at a necessary level and hence to minimize power consumption.

A flow control system designed to perform the above-described load sensing control can feed sufficient pressure oil to each of plural actuators to surely drive the plural actuators in parallel. It can however obtained only fixed flow rate characteristics because the flow rate of pressure oil to be fed is dependent on a maximum load pressure. The driving speed is therefore determined in a wholesale manner by the above-described maximum load pressure so that, when the flow control system is employed to control plural actuators of different types, the flow control system is unable to provide flow rate characteristics conforming with the individual actuators in view of their functions and characteristics. To make it possible to obtain flow rate characteristics conforming with the individual actuators, it has heretofore been necessary for the individual actuators to design operating variable restrictors with different restricted opening characteristics and to retain flow control systems of different ratings. Taking a hydraulic excavator, for example, cylinders as actuators for a boom, an arm and a bucket are designed to be driven at appropriate speeds, respectively, because the driven elements play different roles and their preferred drive speeds are different. It is therefore necessary to mount a variety of flow control systems conforming with the characteristics of such driven elements. This has led to problems in production efficiency and production management.

In a hydraulic work vehicle driven to perform combined work at the same time, operation is not simple because the types of the work are not the same but vary substantially, because it is preferred in some instances to drive each actuator at a standard speed determined based on a stroke of the control lever and in some other instances to perform the work at a drive speed controlled lower than the standard speed. The former operation is intended to improve the efficiency of work, while the latter operation is intended to improve the accuracy of the work or the controllability. Although it is necessary for hydraulic work vehicles of this type to improve the efficiency of work and also the controllability, the conventional flow control systems which can provide only fixed flow rate characteristics are difficult to meet these two demands.

Hydraulic excavators, for example, are used in increasingly diversified ways and are equipped with an increasing number of attachments in recent years due to the diversification and complication of their working sites and enlargement of their application fields. A substantial progress has hence been made in providing hydraulic excavators with many functions. As a result, a majority of work done by a hydraulic excavator has changed from standard work having importance in the efficiency of work such as excavation of the ground or loading of earth or sand so excavated to more complex work or work requiring accuracy. It is hence required to improve not only the work efficiency but also the controllability. It has hence become more important to improve the fine controllability so that the drive speed of each actuator can be increased or decreased little by little while maintaining the drive speed at a reduced speed through a control lever. To achieve this, it is necessary to enlarge an operation range of the control lever, in which fine control of the control lever is feasible, by reducing an increase or decrease in the drive speed of the actuator per unit stroke of the control lever. The conventional flow control systems, which are designed primarily for standard work and can obtain only fixed flow rate characteristics, however cannot meet such a need.

Besides the flow control systems described above, the technique disclosed in WO 92/04505 is also known as a flow control system of the above-described type.

SUMMARY OF THE INVENTION

With the foregoing technical background in view, the present invention has as a first object the provision of a flow control system which can easily obtain flow rate characteristics conforming with various actuators by making correction to fixed flow rate characteristics.

A second object of the present invention is to provide a flow control system which permits improvements in the working efficiency and controllability by making it possible to easily obtain flow rate characteristics conforming with various actuators.

A third object of the present invention is to provide a flow control system which permits common use of parts of various hydraulic work vehicles by making it possible to derive characteristics of various actuators with the parts of the same characteristics.

To attain the above objects, the present invention provides a flow control system arranged in a hydraulic circuit provided with a variable displacement hydraulic pump, plural actuators driven by pressure oil fed from said hydraulic pressure and pump control means for controlling the displacement of said hydraulic pump so that a delivery pressure of said hydraulic pump becomes higher by a predetermined value than a maximum load pressure to said plural actuators, whereby the flow rate of the pressure oil to be fed to said actuators is controlled, comprising plural valve means connected between said hydraulic pump and said actuators, respectively, each of said plural valve means having an operating variable restrictor, whose opening can be varied by control means to control the flow rate of the pressure oil to be fed to the corresponding actuator, and a correcting variable restrictor for correcting a pressure difference across said operating variable restrictor; and pressure compensation valves arranged on upstream sides as viewed in pressure oil feeding directions of restrictor groups disposed corresponding to said actuators and having said operating variable restrictors and said correcting variable restrictors, respectively, the opening of each of said pressure compensation valves being independently set by a drive force in an opening direction based on a downstream pressure of the corresponding restrictor group, a drive force in the opening direction set by pressure-difference setting means and a drive force in a closing direction based on an upstream pressure of the corresponding restrictor group so that the upstream pressure of the corresponding restrictor group becomes higher by a predetermined pressure than the downstream pressure of the corresponding restrictor group.

A similar control system can also comprise plural valve means connected between said hydraulic pump and said actuators, respectively, each of said plural valve means having an operating variable restrictor, whose opening can be varied by control means to control the flow rate of the pressure oil to be fed to the corresponding actuator, and a correcting variable restrictor for correcting a pressure difference across said operating variable restrictor; and pressure compensation valves arranged on downstream sides as viewed in pressure oil feeding directions of restrictor groups disposed corresponding to said actuators and having said operating variable restrictors and said correcting variable restrictors, respectively, the opening of each of said pressure compensation valves being independently set by a drive force in a closing direction based on a maximum load pressure to the corresponding actuator, a drive force in the closing direction for initial setting and a drive force in an opening direction based on a downstream pressure of the corresponding restrictor group so that the downstream pressure of the corresponding responding restrictor group has a constant value sufficient to drive the corresponding actuator under the maximum load pressure.

In each of the above control systems, the operating variable restrictors can be arranged in flow passages for directional control valves which make it possible to drive the corresponding acutators in either a normal or reversed direction.

Where the actuators are those of a hydraulic work vehicle, the operating variable restrictors can be controlled by a control lever of the hydraulic work vehicle.

The above construction makes it possible to correct a pressure difference across each operating variable restrictor by adjusting the restricted opening of the corresponding correcting variable restrictor so that an effective pressure difference can be reduced by an appropriate value. As a result, it has become possible to ensure a large flow rate close to a maximum flow rate of each operating variable restrictor by fully opening its corresponding correcting variable restrictor or to ensure a limited flow rate by reducing the opening of each correcting variable restrictor. This permits a correction to fixed flow rate characteristics as needed.

DETAILED DESCRIPTION OF THE INVENTION AND PREFERRED EMBODIMENTS

First Embodiment

Figure 1:
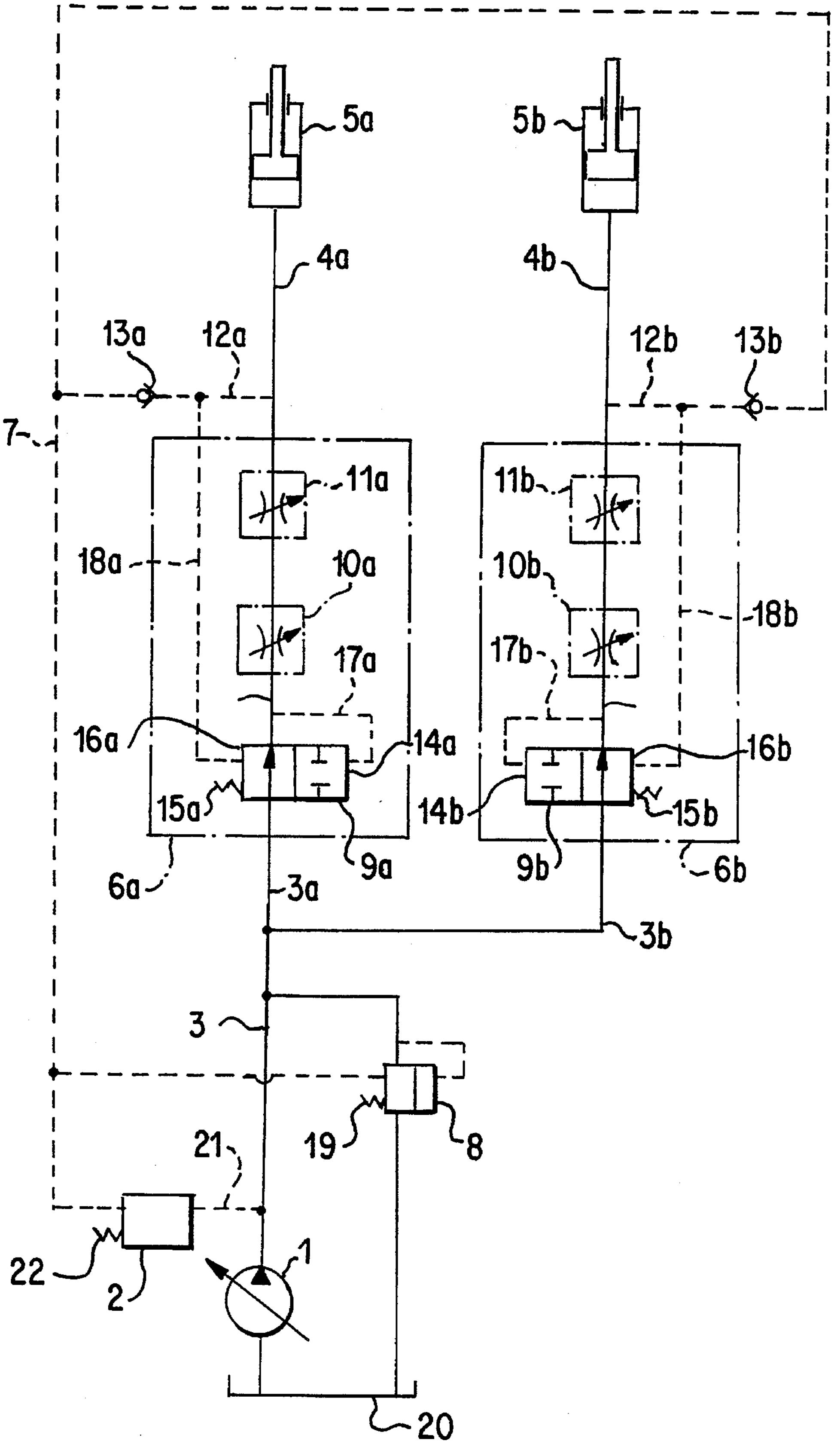
FIG. 1 is a hydraulic circuit for load sensing control, which is equipped with a flow control system according to a first embodiment of the present invention.

FIG. 1 shows the hydraulic circuit equipped with the flow control system according to the first embodiment of the present invention. The hydraulic circuit shown in FIG. 1 is basically constructed of a variable displacement hydraulic pump (hereinafter simply called "the pump") 1 whose delivery capacity is controlled by a tilting control unit 2, a main line 3 connected to a delivery port of the pump 1, first and second branch lines 3*a*,3*b* branched out from the main line 3, first and second load line 4*a*,4*b* connected to these branched lines 3*a*,3*b*, respectively, first and second actuators 5*a*,5*b* connected to the respective load lines 4*a*,4*b* and driven by pressure oil fed from the pump 1, first and second control units 6*a*,6*b* for controlling the flow rates of the pressure oils to be fed to the respective actuators 5*a*,5*b*, a load pressure detection line 7 for guiding to the tilting control unit 2 the pressure of the higher pressure oil out of the pressure oils fed to the respective actuators 5*a*,5*b*, and a pressure control valve 8 for reducing the pressure of the pressure oil, which has been introduced into the main line 3, in accordance with the pressure detected by the load pressure detector 7. In the description to be made hereinbelow, like reference numerals indicate like constituent elements in each branch line and the elements in each branch line are added with the same alphabetic letter as a subscript so that elements of the same type are correlated across the individual branch lines.

The pressure oil is guided from the pump 1 to the first and second flow control units 6*a*,6*b* via the first and second branch lines 3*a*,3*b*. The pressure oil is fed further to the first and second actuators 5*a*,5*b* via the first and second load lines 4*a*,4*b* to independently operate the actuators 5*a*,5*b*. The flow rate control units 6*a*,6*b* are structurally identical to each other and arranged in parallel with each other.

The first flow control unit 6*a* is constructed of a first correcting and operating variable restrictors 10*a*,11*a* arranged in series and a first pressure compensation valve 9*a* arranged corresponding to, upstream of and in series with the variable constrictors 10*a*,11*a* to control pressure differences across the variable restrictors 10*a*,11*a*, respectively, and acting as an auxiliary valve for auxiliarily controlling the flow rate of the pressure oil to be fed to the first actuator 5*a*. The second flow control unit 6*b* is constructed of a second correcting and operating variable restrictors 10*b*,11*b* arranged in series and a second pressure compensation restrictor 9*b* arranged corresponding to, upstream of and in series with the variable constrictors 10*b*,11*b* to control pressure differences across the variable restrictors 10*b*,11*b*, respectively, and acting as an auxiliary valve for auxiliarily controlling the flow rate of the pressure oil to be fed to the second actuator 5*b*. Of the variable restrictors, the first correcting variable restrictor 10*a* and the first operating variable restrictor 11*a* are arranged in the first branch line 3*a* on a downstream side of the first pressure compensation valve 9*a*, while the second correcting variable restrictor 10*b* and the second operating variable restrictor 11*b* are disposed in the second branch line 3*b* on a downstream side of the second pressure compensation valve 9*b*.

The first and second pressure compensation valves 9*a*,9*b* are provided with a first and second closing drive units 14*a*,14*b* and a first and second opening drive units 16*a*,16*b*. An inlet and outlet pressures of the variable restrictors 10*a*,11*a* arranged in series are guided to the first closing and opening drive units 14*a*,16*a*, respectively, so that on the basis of a pressure difference across the variable restrictors 10*a* and 11*a*, the first closing drive unit 14*a* applies a drive force in a valve-closing direction to a spool of the first pressure compensation valve 9*a* while the first opening drive unit 16*a* applies, together with a spring 15*a*, a drive force in a valve-opening direction to the spool of the first pressure compensation valve 9*a*. An inlet and outlet pressures of the variable restrictors 10*b*,11*b* arranged in series are guided to the second closing and opening drive units 14*b*,16*b*, respectively, so that on the basis of a pressure difference across the variable restrictors 10*b* and 11*b*, the second closing drive unit 14*b* applies a drive force in a valve-closing direction to a spool of the second pressure compensation valve 9*b* while the second opening drive unit 16*b* applies, together with a spring 15*b*, a drive force in a valve-opening direction to the spool of the second pressure compensation valve 9*b*. To the closing drive units 14*a*,14*b*, pilot pressures are guided via pilot lines 17*a*,17*b* from upstream sides of the correcting variable restrictors 10*a*,10*b*, respectively. To the opening drive units 16*a*,16*b*, the pilot pressures are guided via pilot lines 18*a*,18*b* from downstream sides of the operating variable constrictors 11*a*,11*b*, respectively.

The pressure control valve 8 is a valve which can also be called "an unloading valve", and is arranged on an upstream side of a portion of the main line 3 at which portion the main line bifurcates into the branch lines 3*a*,3*b*. When the delivery pressure of the pump 1 reaches a pressure which is the sum of a maximum load pressure of the actuators 5*a*,5*b* and a preset pressure of the pressure control valve 8 preset by a spring 19, the pressure oil delivered from the pump 1 is recirculated to the tank 20 so that the pressure of the circuit is prevented from exceeding the sum. Incidentally, a delivery pressure detection line 21 for the detection of a delivery pressure from the pump 1 is connected to the tilting control unit 2, whereby the delivery pressure of the pump 1 is controlled to a pressure higher by a predetermined value, which is set by a spring 22, than a maximum load pressure guided from the load pressure detection line 7.

The variable constrictors 10*a*,11*a*;10*b*,11*b* consist of flow control valves, respectively. Their openings are changed by unillustrated control means, for example, a control lever so that the flow rates can be set by restricting action as desired. The flow control units 6*a*,6*b* themselves are constructed as a compound unit of different functions by an integral and inseparable valve unit as also described in connection with the second embodiment.

In the hydraulic circuit constructed as described above, an operation of the actuators 5*a*,5*b* is performed by suitably setting the openings of the variable restrictors 10*a*,11*a*;10*b*, 11*b*. A description will first be made of an operation when the actuators 5*a*,5*b* are driven by controlling the operating variable restrictors 11*a*,11*b* while maintaining the correcting variable restrictors 10*a*,10*b* in their fully open positions.

Now assume that the pump 1 is operated, the operating variable restrictors 11*a*,11*b* are controlled by an operator to feed pressure oils to the respective actuators 5*a*,5*b* through the main line 3, the corresponding branch lines 3*a*,3*b* and the corresponding load lines 4*a*,4*b*, and the respective actuators 5*a*,5*b* are hence driven independently and in parallel by the pressure oils, respectively. The greater one of load pressures to the individual actuators 5*a*,5*b* is guided to the tilting control unit 2 from one of the load lines 4*a*,4*b*, said one load line being on a side of the maximum load pressure, via a connecting line 12*a* or 12*b* corresponding to the one load line and then via the load pressure detection line 7. On the other hand, a delivery pressure of the pump 1 is also guided to the tilting control unit 2 from the main line 3 via the delivery pressure detection line 21. The tilting control unit 2 controls the tilting of the pump 1 on the basis of these pressure signals so that the delivery capacity of the pump 1 is decreased when the delivery pressure of the pump 1 is higher than the sum of the maximum load pressure and a predetermined value, namely, a load sensing pressure difference but is increased when the delivery pressure of the pump 1 is lower than the sum. As a result, the delivery capacity of the pump 1 is controlled to make its delivery pressure higher by a predetermined value than the maximum load pressure, whereby load sensing control is performed. When one of the actuators 5*a*,5*b* is solely driven, the load pressure to the solely-driven actuator 5*a* or 5*b* is taken as the maximum load pressure and similar control is performed.

When control is performed as described above and the actuators 5*a*,5*b* are driven in parallel, the load pressures from the load lines 4*a*,4*b* are guided from the pilot lines 18*a*,18*b* to the opening drive units 16*a*,16*b* of the pressure compensation valves 9*a*,9*b*, respectively, whereas the upstream-side pressures of the correcting variable restrictors 10*a*,10*b* are guided from the pilot lines 17*a*,17*b* to the closing drive units 14*a*,14*b*, respectively. When the downstream-side pressures of the operating variable restrictors

11*a*,11*b* exceed the sums of the load pressures and the corresponding spring forces of the springs 15*a*,15*b*, respectively, the drive forces in the closing directions are correspondingly increased so that the opening areas of the pressure compensation valves 9*a*,9*b* are reduced. Immediately before their openings are closed, the upstream-side pressures of the operating variable restrictors 11*a*,11*b* are substantially equal to the sums of the corresponding load pressures and spring forces, respectively. As a result, the pressure differences across the operating variable restrictors 11*a*,11*b* have values equivalent to the values obtained by subtracting the downstream-side pressures of the corresponding operating variable restrictors 11*a*,11*b*, that is, the load pressures from the upstream-side pressers of the corresponding operating variable restrictors 11*a*,11*b*, in other words, to the forces applied by the corresponding springs. When the load pressures increase or the upstream-side pressures of the operating variable restrictors 11*a*,11*b* drop in the above state, the drive forces applied in the opening directions to the pressure compensation valves 9*a*,9*b*, respectively, increase relative to the upstream-side pressures so lowered so that the opening areas of the pressure compensation valves 9*a*,9*b* are increased. In this manner, the openings of the pressure compensation valves 9*a*,9*b* are automatically controlled to raise the upstream-side pressures of the operating variable restrictors 11*a*,11*b*. When the load pressures or the upstream-side pressures begin to return toward the previous levels, the closing drive forces increase as opposed to the load pressures or the upstream-side pressures to reduce the opening areas of the pressure compensation valves 9*a*,9*b*, whereby the openings of the pressure compensation valves 9*a*,9*b* are automatically controlled to lower the upstream-side pressures of the operating variable restrictors 11*a*,11*b*. As is appreciated from the foregoing, the pressure compensation valves 9*a*,9*b* are automatically controlled to keep constant the pressure differences across the variable restrictors 10*a*,11*a*;10*b*,11*b*. As a result, the pressure difference across the operating variable restrictors 11*a*,11*b* are compensated in pressure by the pressure compensation valves 9*a*,9*b* so that they always remain constant irrespective of the load pressures. Further, the operating variable restrictors 11*a*,11*b* feed pressure oils of a constant flow rate to the actuators 5*a*,5*b* in accordance with their restricted openings without being affected by the load pressures to the actuators 5*a*,5*b*. The drive speeds of the actuators 5*a*,5*b* are therefore maintained constant as long as the corresponding restricted openings remain constant.

In this state, the correcting variable restrictors 10*a*,10*b* are kept open so that they are not functioning at all. Accordingly, a description will next be made of the situation that the openings of the correcting variable restrictors 10*a*,10*b* have also been changed in addition to the changes to the openings of the operating variable restrictors 11*a*,11*b*. When the openings of these correcting variable restrictors 10*a*,10*b* are changed, the pressure differences across the operating variable restrictors 11*a*,11*b* are changed. It is therefore possible to set the pressure differences across the operating variable restrictors 11*a*,11*b* at desired values by changing the restricted openings of the correcting variable restrictors 10*a*,10*b* as needed. Functions of these operating variable restrictors 11*a*,11*b* and correcting variable restrictors 10*a*, 10*b* will hereinafter be described in detail.

As the openings of the pressure compensation valves 9*a*,9*b* are controlled to make the pressure differences between the upstream-side pressures of the correcting variable restrictors 10*a*,10*b* and the downstream-side pressures of the operating variable restrictors 11*a*,11*b* become equal to the resilient biasing forces of the springs 15*a*,15*b*, respectively, their relationship can be expressed by the following formula:

$$
\begin{aligned}
a(Pz_i - Pl_i) &= k_i(xo_i + x_i) \\
\therefore Pz_i - Pl_i &= (xo_i + x_i)k_i/a \\
&= \Delta Po
\end{aligned}
\qquad (1)
$$

where $Pz_i$: The upstream-side pressure of the correcting variable restrictor 10*a* or 10*b* (the secondary pressure of the pressure compensation valve 9*a* or 9*b*).

$Pl_i$: The downstream-side pressure of the operating variable restrictor 11*a* or 11*b* (the load pressure to the actuator 5*a* or 5*b*).

a: The pressure-receiving area of the pressure compensation valve 9*a* or 9*b* for $Pz_i$ and $Pl_i$.

$k_i$: The spring constant of the spring 15*a* or 15*b*.

$xo_i$: The displacement of the spring 15*a* or 15*b* given upon initial setting.

$x_i$: The displacement of the spring 15*a* or 15*b* occurred upon application of a controlling force.

$Po_i$: The pressure difference between the upstream-side pressure of the correcting variable restrictor 10*a* or 10*b* and the downstream-side pressure of the operating variable restrictor 11*a* or 11*b*.

On the other hand, the delivery pressure Ps of the pump 1 which feeds the pressure oil to the pressure compensation valves 9*a*,9*b* on primary sides thereof is controlled by load sensing control so that the delivery pressure Ps becomes higher than a maximum load pressure Plmax by a predetermined value, namely, a load sensing pressure difference ΔPLS. The delivery pressure Ps of the variable displacement hydraulic pump 1 is controlled to always provide the constant load sensing pressure difference ΔPLS owing to the load sensing control as indicated by the following formula:

$$Ps = Pl\max + \Delta PLS \qquad (2)$$

This load sensing pressure difference ΔPLS is set to substantially satisfy the following formula:

$$\Delta PLS = \Delta PO_i \qquad (3)$$

that is, to become equal to the pressure difference $\Delta Po_i$ between the upstream-side pressure of the correcting variable restrictor 10*a* or 10*b* and the downstream-side pressure of the operating variable restrictor 11*a* or 11*b* (hereinafter called "the pressure difference across the restrictor").

As is evident from these formulas (2) and (3), each pressure compensation valve 9*a* or 9*b* performs control so that the pressure difference $\Delta Po_i$ across the restrictor at a substantially constant value which is equal to the resilient biasing force of the spring 15*a* or 15*b*. Since the load sensing pressure difference ΔPLS is set equal to the biasing force, the pressure compensation valve 9*a* or 9*b* performs control so that as a matter of fact, the pressure difference $\Delta Po_i$ across the restrictor is held at a constant value substantially equal to the load sensing pressure difference ΔPLS. The relationship among this pressure difference $\Delta Po_i$ across the restrictor, the pressure difference $\Delta Pv_i$ across the operating variable restrictor 11*a* or 11*b* and the pressure difference $\Delta Pm_i$ across the correcting variable restrictor 10*a* or 10*b* can be expressed by the following formula:

$$\Delta Po_i = \Delta Pv_i + \Delta Pm_i \qquad (4)$$

From these formulas (3) and (4), the pressure difference $\Delta Pm_i$ across the correcting variable restrictor 10*a* or 10*b* can be expressed using the pressure difference $\Delta Pv_i$ across the operating variable restrictor 11*a* or 11*b* as shown by the following formula:

$$\Delta Pm_i = \Delta Po_i - \Delta Pv_i = \Delta PLs - \Delta Pv_i \quad (5)$$

Further, the relationships between the pressure differences $\Delta Pv_i$,$\Delta Pm_i$ across the operating variable restrictor 11*a* or 11*b* and the correcting variable restrictor 10*a* or 10*b* and flow rates $Qv_i$,$Qm_i$ across the operating variable restrictor 11*a* or 11*b* and the correcting variable restrictor 10*a* or 10*b* can be expressed by the following formulas:

$$Qv_i = N \cdot A_i \sqrt{(\Delta Pv_i)} \quad (6)$$

$$Qm_i = N \cdot B_i \sqrt{(\Delta Pm_i)} \quad (7)$$

where $Qv_i$: The flow rate through the operating variable restrictor 11*a* or 11*b*.

$Qm_i$: The flow rate through the correcting variable restrictor 10*a* or 10*b*.

$A_i$: The restricted opening area of the operating variable restrictor 11*a* or 11*b*.

$B_i$: The restricted opening area of the operating variable restrictor 10*a* or 10*b*.

N: Constant.

The flow rate $Qv_i$ across the operating variable restrictor 11*a* or 11*b* and the flow rate $Qm_i$ through the correcting variable restrictor 10*a* or 10*b* are flow rates of the pressure oil flowing through the same flow passage and are hence equal to each other. The following formula can therefore be derived form the formulas (5), (6) and (7). As a consequence, the pressure difference $Pv_i$ across each operating variable restrictor 11*a* or 11*b* can be expressed as follows:

$$N \cdot A_i \sqrt{(\Delta Pv_i)} = N \cdot B_i \sqrt{(\Delta Pm_i)} = N \cdot B_i \sqrt{(\Delta PLs - \Delta Pv_i)} \quad (8)$$

$$\therefore Pv_i = (B_i/A_i)^2/\{1 + (B_i/A_i)^2\} \cdot \Delta PLs = X_i^2/(1 + X_i^2) \cdot \Delta PLs$$

Incidentally, $X_i$ means the opening area ratio ($B_i/A_i$) of the correction variable restrictor 10*a* or 10*b* to the operating variable restrictor 11*a* or 11*b*.

Further, the flow rage $Qv_i$ through the operating variable restrictor 11*a* or 11*b* is expressed as follows:

$$Qv_i = N \cdot A_i \sqrt{(\Delta Pv_i)} = N \cdot A_i \sqrt{\{X_i^2/(1 + X_i^2) \cdot \Delta PLs\}} = \sqrt{\{X_i^2/(1 + X_i^2)\}} \cdot N \cdot A_i \sqrt{(\Delta PLs)} \quad (9)$$

Figure 6:
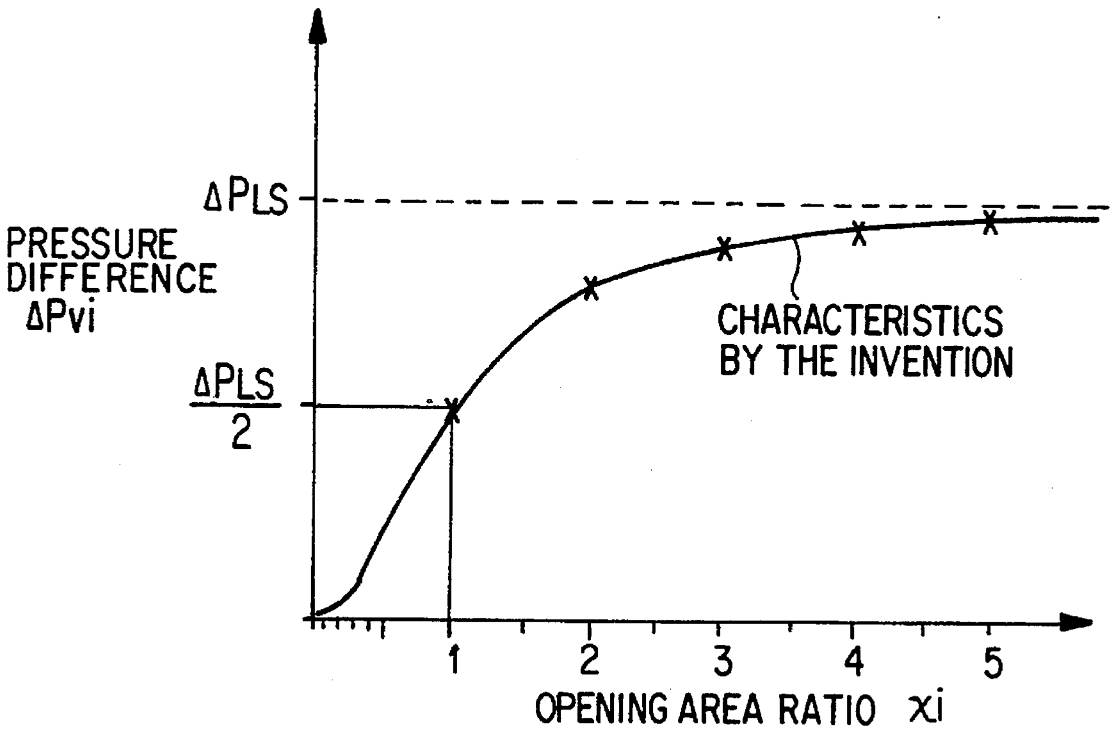
FIG. 6 is a characteristic diagram showing characteristics of a pressure difference across an operating variable restrictor in a flow control system according to the present invention.

The relationship represented by the above formula (8), that is, the characteristics of how the pressure difference $\Delta Pv_i$ across the operating variable restrictor 11*a* or 11*b* changes depending on the opening area ratio $X_i$ can be illustrated as shown in FIG. 6. The characteristics of the operating variable restrictor 11*a* or 11*b* illustrated in FIG. 6 generally indicate that the difference $\Delta Pv_i$ across the operating variable restrictor 11*a* or 11*b* becomes greater to have a value closer to the load sensing pressure difference ΔPLS (i.e., the compensating pressure by the pressure compensation valve 9*a* or 9*b*) as the ratio of the opening area $B_i$ of the correcting variable restrictor 10*a* or 10*b* to the opening area $A_i$ of the operating variable restrictor 11*a* or 11*b* becomes greater and also that as the ratio becomes smaller, the effective pressure difference across the operating variable restrictor 22 or 23 decreases and the pressure difference $\Delta Pv_i$ across the operating variable restrictor 22 or 23 becomes smaller.

According to this embodiment, the opening area ratio $X_i$ at the time of full opening of the operating variable restrictor 11*a* or 11*b* is set at a sufficiently large value by performing control so that the restricted opening of the correcting variable restrictor 11*a* or 10*b* becomes sufficiently large relative to the restricted opening of the operating variable restrictor 11*a* or 11*b* at the time of full opening (i.e., when the control lever is moved over the entire storke). This has made it possible to surely maintain such a large flow rate as that available when the operating variable restrictors 10*a*, 10*b* are not arranged. Further, by setting the opening area ratio $X_i$ at the time of full opening of the operating variable restrictor 11*a* or 11*b* smaller than the value set above at the sufficiently large value to an extent not causing any abrupt change in the pressure difference across the operating variable restrictor 11*a* or 11*b* even when the operated quantity of the operating variable restrictor 11*a* or 11*b* is changed, a rather limited flow rate can be secured in accordance with the opening area ratio $X_i$ so set.

Adequate setting of the restricted opening of the correcting variable restrictor 10*a* or 10*b* within such limits that no abrupt change would take place in the pressure difference across the restrictor makes it possible to freely adjust within a predetermined range the flow rate of pressure oil to be fed to the actuators 5*a*, 5*b* during standard work. As a result, it is possible to make corrections to fixed flow rate characteristics of the conventional flow control systems not equipped with the correcting variable restrictors 10*a*, 10*b* so that flow rate characteristics conforming with various kinds of actuators can be readily obtained. Further, by performing control so that the ratio of the open area of the correcting variable restrictor 10*a* or 10*b* to the open area of the operating variable restrictor 11*a* or 11*b* at the time of full opening becomes smaller than the sufficiently large opening area ratio $X_i$, the drive speed of the actuator 5*a* or 5*b* per unit stroke of the control lever can be kept slow. This has made it possible to expand the operation range of the shift lever in which fine control can be performed, thereby improving the controllability. In this case, as the opening area ratio $X_i$ is made smaller, the pressure difference across the operating variable restrictor 11*a* or 11*b* undergoes a greater change per unit stroke of the control lever. As the stroke of the control lever is made greater, the flow rate increases although the percent increment in the flow rate becomes smaller. As a result, an increase in the frive speed of the actuator 5*a* or 5*b* per unit stroke is more limited as the drive speed becomes higher. This means that the drive speed can be adjusted by still smaller degrees in a relative large range. As a consequence, the control range of the control lever, in which fine control can be performed, can be enlarged under ideal conditions, thereby making it possible to obtain a flow control system suitable especially for work which is complex and requires accuracy.

The above-described characteristics which have made it possible to prevent the drive speed of the actuator 5*a* or 5*b* from increasing significantly even when the control lever is moved over a large stroke can also be used for an operation in which no quick drive of the actuator 5$a$ or 5$b$ is desired, for example, for lowering a boom. Appropriate use of the above characteristics in various stages of work permit use of the flow control system for diversified applications. Adding further, if it is desired to have the drive speed of the actuator 5$a$ or 5$b$ always varied in proportion to a stroke of the control lever in various work, it is only necessary to design in such a way that the opening area ratio $X_i$ can be always maintained constant by having the restricted opening of the correcting variable restrictor 10$a$ or 10$b$ associated with the restricted opening of the operating variable restrictor 11$a$ or 11$b$, for example, by controlling these variable restrictors under the control of a pilot pressure.

In the flow control system according to this embodiment, the correcting variable restrictors 10$a$,10$b$ are arranged on the upstream sides of the operating variable restrictors 11$a$,11$b$, respectively, so that two restrictor groups, each consisting of the two restrictors, are formed. Insofar as the arrangement of the pressure compensation valves 9$a$,9$b$ relative to these restrictor groups meet such a relationship as in this embodiment, absolutely no influence takes place to the formulas described above even if the positional relationship between the correcting variable restrictors 10$a$ or 10$b$ and the operating variable restrictor 11$a$ or 11$b$ is made opposite. It is therefore clear that no variations occur in the characteristics of the flow control system no matter how their positional relationship is. Accordingly, similar functions can be exhibited even if the positional relationship between the correcting variable restrictor 10$a$ or 10$b$ and the operating variable restrictor 11$a$ or 11$b$ is changed as needed.

Second Embodiment

Figure 2:
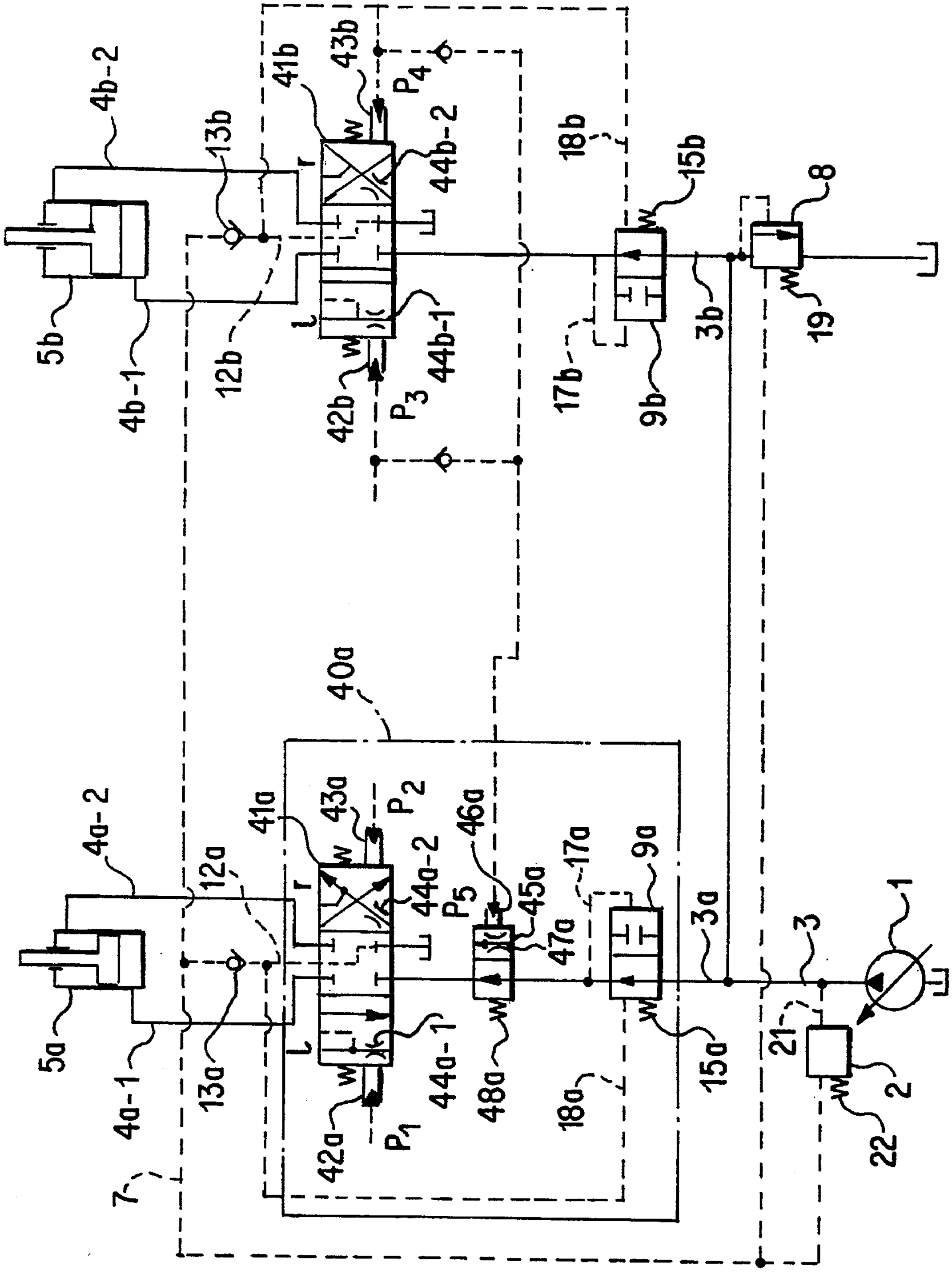
FIG. 2 is a hydraulic circuit for load sensing control, which is equipped with a flow control system according to a second embodiment of the present invention.

The hydraulic circuit according to the second embodiment is illustrated in FIG. 2. This embodiment is different from the above-described first embodiment in that the first and second actuators 5$a$,5$b$ can be driven in both directions. This bidirectional drive has been enabled by directional control valves. This embodiment is characterized in that the actuators 5$a$,5$b$ are provided with load lines 4a-1,4a-2; 4b-a,4b-2, respectively, and the drive directions and speeds of the actuators 5$a$,5$b$ can be controlled by a first and second directional control valves 41$a$,41$b$. The remaining elements are equivalent to the corresponding elements of the first embodiment so that such equivalent elements are identified by like reference numerals. A description will therefore be made of different elements only.

In FIG. 2, the load lines 4a-1,4b-1 are connected to bottom-side compartments of the actuators 5$a$,5$b$ while the load lines 4a-2,4b-2 are connected to rodside compartments of the actuators 5$a$,5$b$. The load lines 4a-1,4a-2 are each connected to the first directional control valve 41$a$ while the load lines 4b-1,4b-2 are each connected to the second directional control valve 41$b$. The directional control valves 41$a$,41$b$ are connected to an unillustrated hydraulic pilot device. In the directional control valve 41$a$, pilot pressures $P_1$,$P_2$ from the hydraulic pilot device operated by a control lever (not shown) are fed to pilot terminals 42$a$,43$a$, respectively, so that the directional changeover and opening of the directional control valve 41$a$ are controlled. In the directional control valve 41$b$, on the other hand, pilot pressures from the hydraulic pilot device operated by the unillustrated control lever are similarly fed to pilot terminals 42$b$,43$b$ so that the directional change-over and opening of the directional control valve 41$b$ are performed.

The directional control valves 41$a$,41$b$ are internally provided with operating variable restrictors 44a-1,44a-2;44b-1,44b-2 having similar functions to the operating variable restrictors 11$a$,11$b$ in the first embodiment described above. When the control lever of the unillustrated hydraulic pilot control device is operated to drive a piston rod of the first actuator 5$a$ in an advancing direction, the first directional control valve position to a left position as viewed in the drawing. When the control lever is operated to drive the piston rod of the first actuator 5$a$ in a retreating direction, the first directional control valve 41$a$ is switched by a pilot pressure $P_2$ from the center valve position to a right position as viewed in the drawing. Likewise, the second directional control valve 41$b$ is switched by a pilot pressure $P_3$ from a neutral valve position to a left position as viewed in the drawing when the control lever is operated to drive a piston rod of the second actuator 5$b$ in an advancing direction, and is switched by a pilot pressure $P_4$ from the neutral valve position to a right position when the control lever is operated to drive the piston rod of the second actuator 5$b$ in a retreating direction. The directional control valves 41$a$,41$b$, when switched to the left positions, feed the pressure oils from the load lines 4a-1, 4b-1 to the bottom-side compartment of the actuators 5$a$,5$b$ via the operating variable restrictors 44a,44b-1, respectively, and have the other load lines 4a-2,4b-2 communicated to corresponding tank ports to release the pressure oils from the rod-side compartments of the respective actuators 5$a$,5$b$ to the tank 20, whereby the actuators 5$a$,5$b$ are driven upward. When switched to the right positions, the directional control valves 41$a$,41$b$ feed the pressure oils from the respective load lines 4a-2,4b-2 to the rod-side compartments of the actuators 5$a$,5$b$ via the operating variable restrictors 44a-2,44b-2, respectively, and have the other load lines 4a-2,4b-2 communicated to corresponding tank ports to release the pressure oils from the bottom-side compartments of the respective actuator 5$a$,5$b$ to the tank 20, whereby the actuators 5$a$,5$b$ are driven downward. At this time, displacements of spools of the directional control valves 41$a$,41$b$ are controlled in accordance with the values of the pilot pressures $P_1$,$P_2$,$P_3$,$P_4$ outputted by the hydraulic pilot control device, in other words, by the strokes of the control lever so that the restricted openings of the individual variable restrictors 44a,44a-2;44b-1,44b-2 are set.

Further, a flow control valve 45$a$ is arranged in the branch line 3$a$ on the downstream side of the first pressure compensation valve 9$a$ so that the rate of a flow to the first directional control vale 41$a$ can be adjusted. One of ports of the flow control valve 45$a$ is provided with a correcting variable restrictor 47$a$ so that a pressure difference across the first directional control valve 41$a$ can be corrected. The other port can feed the pressure oil to the directional control valve 41$a$ without any restriction. Further, to a pilot terminal 46$a$ at one (restricted) portion of the flow control valve 45$a$, the higher one of the pilot pressures $P_3$,$P_4$ to be guided to the second directional control valve 41$b$ arranged in the branch line 3$b$ is guided as a pilot pressure $P_5$. A spool of the flow control valve 45$a$ is displaced in accordance with the balancing in drive force between the pilot pressure $P_5$ and the spring force of a spring attached to an opposite port to regulate the initial setting pressure, whereby the restricted opening of the variable restrictor 47$a$ is set.

In this embodiment, in the course of driving the actuators 5$a$,5$b$ through the directional control valves 41$a$,41$b$, the spool of the flow control valve 45$a$ is displaced to change the opening of the correcting variable restrictor 47$a$, whereby the pressure difference across the restrictor of the directional control valve 41*a* can be corrected. With respect to the actuator 5*a*, the characteristics of the operating variable restrictors 44a-1,44a-2 are changed as in the first embodiment so that characteristics suited for work or operation can be selected. Incidentally, the operating system of the actuator 5*b* in the second embodiment is not provided with any correcting variable restrictor and the restricted opening is set by the pilot pressures for the switching control of the directional control valve 41*b*. The hydraulic circuit is therefore driven with priority on the side of the actuator 5*b*.

In FIG. 2, the initial setting pressure of the flow control valve 45*a* is set by the spring 48*a*, and the correcting variable restrictor 47*a* functions only when the pilot pressure $P_5$ has exceeded the initial setting pressure of the spring 48*a*. Other elements which have not been described specifically are constructed as in the first embodiment and exhibit similar effects.

Third Embodiment

Figure 3:
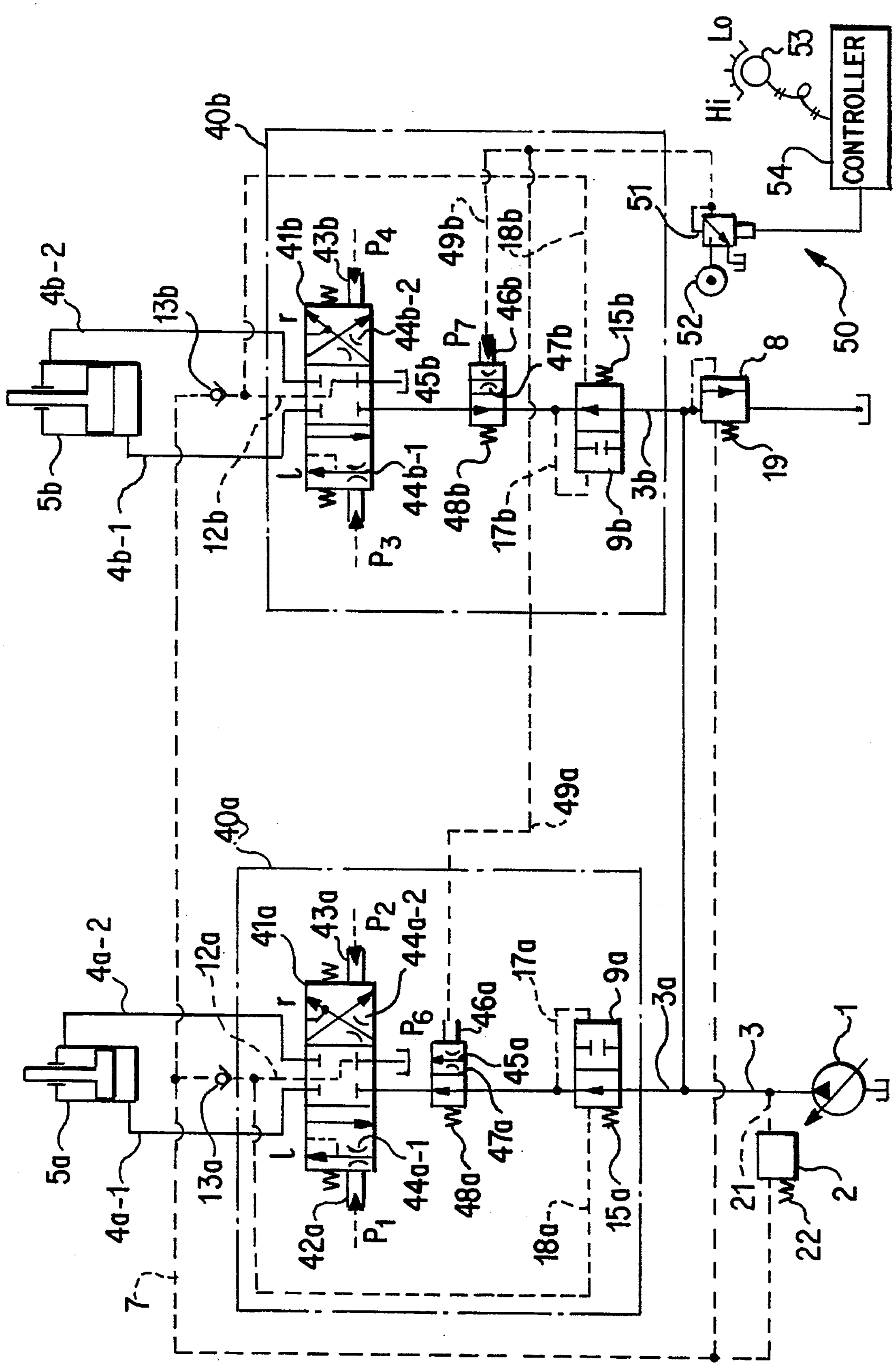
FIG. 3 is a hydraulic circuit for load sensing control, which is equipped with a flow control system according to a third embodiment of the present invention.

The hydraulic circuit according to the third embodiment is illustrated in FIG. 3. This embodiment is similar to the second embodiment except for the additional arrangement of a variable restrictor in the second branch line 3*b* so that the variable restrictor can be used for the drive and control of the second actuator 5*b*. In this embodiment, too, only elements different from the first and second embodiments will be described, and elements considered to be equivalent to their corresponding elements in the first and second embodiments will be identified by like reference numerals and their description is omitted herein.

As is understood from FIG. 3, this embodiment is provided with a second flow control valve 45*b*, which is similar to the first flow control vale 45*a* arranged in the branch line 3*a*, in the branch line 3*b* between the second pressure compensation valve 15*b* and the second directional control valve 41*b*, pilot pressure feed lines 49*a*,49*b* connected to the pilot terminal 46*a* of the first flow control valve 45*a* and the pilot terminal 46*b* of the second flow control valve 45*b* to feed pilot pressures $P_6$,$P_7$, and a pilot pressure control unit 50 for controlling these pilot pressure $P_6$,$P_7$. The remaining elements are constructed as in the second embodiment shown in FIG. 2. Incidentally, the pilot control unit 50 is constructed of a solenoid-operated proportional pressure reducing valve 51 and a controller 54. The solenoid-operated proportional pressure reducing valve 51 feeds the pressure oil from an oil pressure source 52 to the pilot lines 49*a*,49*b* after reducting the pressure of the pressure oil, whereas the controller 54 controls the opening of the solenoid-operated proportional pressure reducing vale 51 in accordance with a command from a speed-adjusting dial 53 to change each pilot pressure. Owing to this construction, the operator can change pilot pressures $P_6$,$P_7$ by controlling the speed-adjusting dial 53. The openings of the correcting variable restrictors 47*a*,47*b* then vary in accordance with the pilot pressures $P_6$,$P_7$ so changed, whereby the pressure differences across the operating variable restrictors 44a-1,44a-2;44b-1,44b-2 of the directional control valves 41*a*,41*b* can be set as needed.

In this embodiment, it is designed to simultaneously change the pilot pressures $P_6$,$P_7$ by the single speed-adjusting dial 53. It is however possible to arrange two speed-adjusting dials so that the pilot pressures $P_6$,$P_7$ can be separately set to independently set the openings of the correcting variable restrictors 47*a*,47*b*. This matter should be determined as needed depending on the performance and application of a hydraulic equipment in which the hydraulic control system is used. Other elements which have not been described specifically are constructed as in the first and second embodiments and exhibit similar effects to those in the first and second embodiments.

Fourth Embodiment

Figure 4:
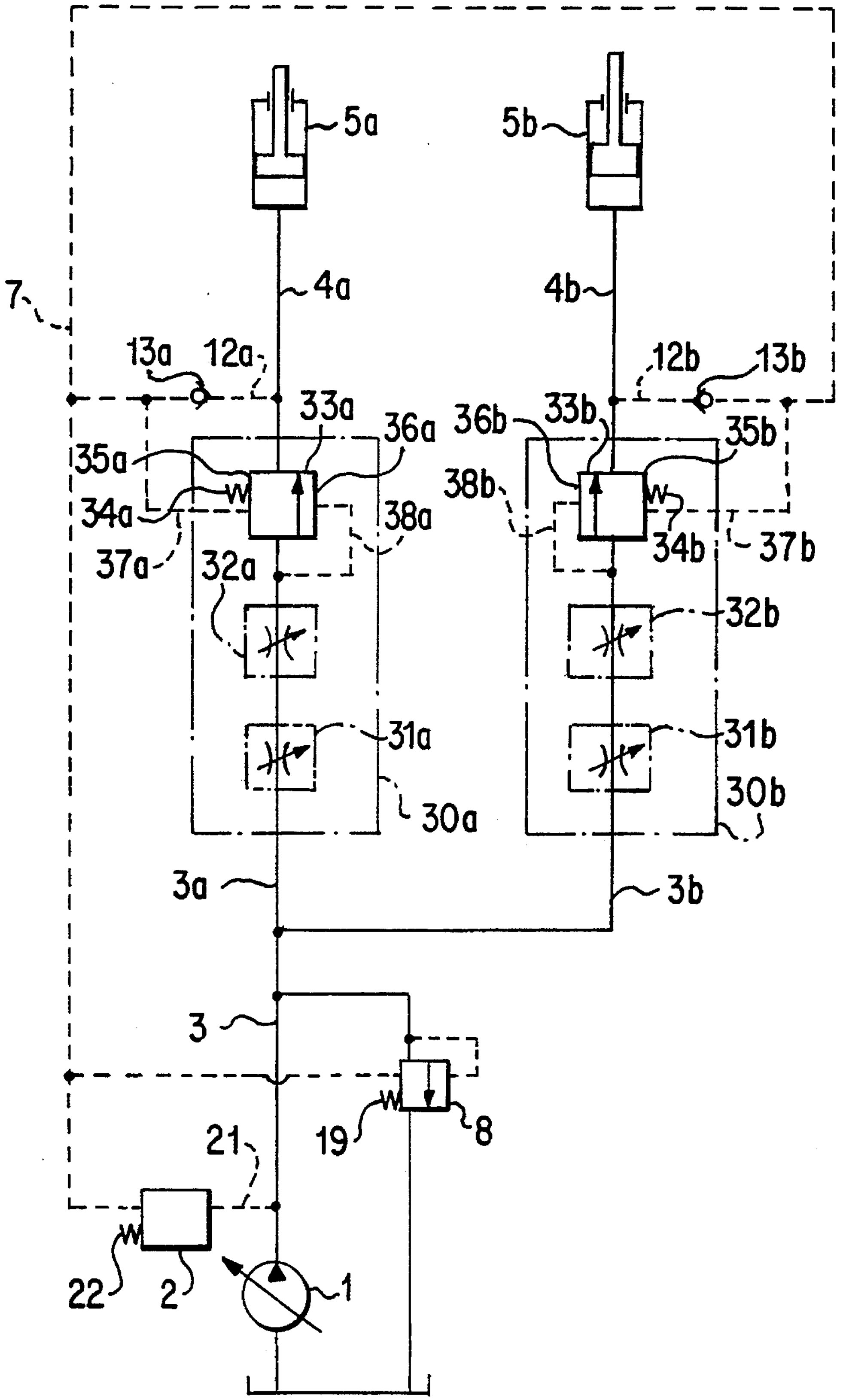
FIG. 4 is a hydraulic circuit for load sensing control, which is equipped with a flow control system according to a fourth embodiment of the present invention.

The hydraulic circuit according to the fourth embodiment is illustrated in FIG. 4. As this embodiment is constructed in a similar manner to the above-described first embodiment except for the first and second flow control units 9*a*,9*b*, a description will be made of flow control units only. Like elements to the corresponding ones in the first embodiment are identified by like reference numerals, and any overlapping description is omitted herein.

In FIG. 4, a first and second flow control units 30*a*,30*b* are constructed of a first and second correcting variable restrictors 31*a*,31*b*, a first and second operating variable restrictors 32*a*,32*b* and a first and second pressure compensation valves 33*a*,33*b*, respectively. These restrictors and valves are arranged in the first and second branch lines 3*a*,3*b* in the order they are presented from the upstream sides as viewed in the feeding direction of pressure oil. The pressure compensation valves 33*a*,33*b* are provided with closing drive units 35*a*,35*b* for applying a drive force, which is based on a maximum load pressure, in valve-closing directions to them together with spring forces of springs 34*a*,34*b* and also with opening drive units 36*a*,36*b* for applying drive forces in valve-opening directions. Pilot pressures are guided from downstream sides of a first and second check valves 13*a*,13*b* to the closing drive units 35*a*,35*b* via pilot lines 37*a*,37*b*, respectively, while pilots pressures are guided from downstream sides of the first and second operating variable restrictors 32*a*,32*b* to the opening drive units 36*a*,36*b* via pilot lines 38*a*,38*b*, respectively. A control mechanism and the like for the variable restrictors 31*a*,32*a*;31*b*,32*b*, including matters not specifically described here, are all constructed as in the first embodiment. In this embodiment, the flow control units are also constructed as a compound unit having different functions, namely, inseparably as a valve unit.

In the fourth embodiment constructed as described above, the actuators 5*a*,5*b* are operated by setting the openings of the variable restrictors 31*a*,32*a*;31*b*,32*b* of the hydraulic circuit as needed like the first embodiment. With respect to this embodiment, a first description will also be made of an operation when the actuators 5*a*,5*b* are driven by controlling only the operating variable restrictors 32*a*,32*b* while maintaining the correcting variable restrictors 31*a*,32*a* in the fully-opened positions.

When the actuators 5*a*,5*b* are driven in parallel, a maximum load pressure in the load pressure detection line 7 is guided to the closing drive units 35*a*,35*b* of the pressure compensation valves 33*a*,33*b* via the pilot lines 37*a*,37*b*, respectively. On the other hand, downstream pressures of the operating variable restrictors 32*a*,32*b* are guided to the closing drive units 36*a*,36*b* of the pressure compensation vales 33*a*,33*b* via the pilot lines 38*a*,38*b* so that drive forces are applied in the valve-opening directions, respectively. When the downstream pressures of the operating variable restrictors 32*a*,32*b* become higher than predetermined values set by the maximum load pressure and the spring forces of the springs 34*a*,34*b*, the opening drive forces are increased correspondingly to enlarge the openings of the pressure compensation valves 33*a*,33*b*, whereby hydraulic pressures of values sufficient to drive the actuators 5$a$,5$b$ are hence fed to the actuators 5$a$,5$b$. If the maximum load pressure begins to drop or the downstream pressures of the operating variable restrictors 32$a$,32$b$ begin to become still higher under the above situation, the pressure compensation valves 33$a$,33$b$ increase their flow passage areas further so that their openings are self-controlled to lower the downstream pressures. If the maximum load pressure begins to increase or the downstream pressures begin to drop conversely, the pressure compensation valves 33$a$,33$b$ decrease their flow passage areas so that their openings are self-controlled to increase the downstream pressures. As a consequence, the downstream pressures of the operating variable restrictors 32$a$,32$b$ are always maintained at levels somewhat higher than the maximum load pressure owing to such a pressure-regulating function of the pressure compensation valves 33$a$,33$b$ without being affected by variations in the circuit pressure such as the load pressures to the actuators 5$a$,5$b$ or the delivery pressure of the pump 1. In other words, the pressure differences across the operating variable restrictors 32$a$,32$b$ are compensated in pressure to always remain constant without being affected by variations in the openings of the operating variable restrictors 32$a$,32$b$ or the loads to the actuators 5$a$,5$b$, also owing in part to the control of the delivery pressure of the pump 1 in accordance with the load sensing control. As a result, the operating variable restrictors 32$a$,32$b$ can be set at constant flow rates corresponding to their restricted openings without being affected by variations in the pressure of the circuit.

In the above state, the correcting variable restrictors 31$a$,31$b$ are, as described above, kept open and not functioning at all. When the openings of the correcting variable restrictors 31$a$,31$b$ are also changed in addition to the operating variable restrictors 32$a$,32$b$, the pressure differences across the operating variable restrictors 32$a$,32$b$ also change. By changing the restricted openings of the correcting variable restrictors 31$a$,31$b$ as needed, the pressure differences across the operating variable restrictors 32$a$,32$b$ can therefore be set at desired values. This characteristic will hereinafter be described using formulas.

With respect to the pressure compensation valves 33$a$, 33$b$, first, the downstream pressure of each operating variable restrictors 32$a$ or 32$b$ arranged on the upstream stream side of the pressure compensation valves 33$a$ or 33$b$, in other words, the downstream pressure $Pz_i$ of each restrictor group can be expressed by the following formula:

$$\begin{aligned} Pz_i &= Pl\max + k_i/a(Zo_i + Z_i) \\ &= Pl\max + Co_i \end{aligned} \tag{10}$$

where $Pz_i$: The downstream pressure of the operating variable restrictor 32$a$ or 32$b$ (the primary pressure of the pressure compensation valve 33$a$ or 33$b$).

Plmax: The maximum load pressure.

a: The pressure-receiving area of the pressure compensation valve 33$a$ or 33$b$ for Plmax and $Pz_i$.

$k_i$: The spring constant of the spring 34$a$ or 34$b$.

$Zo_i$: The displacement of the spring 34$a$ or 34$b$ applied upon initial setting.

$Z_i$: The displacement of the spring 34$a$ or 34$b$ upon application of a control force.

$Co_i$: Constant.

In the above formula (10), $Co_i$ stands for the resilient biasing force $k_i/a(Zo_i+Z_i)$ of the spring 34$a$ or 34$b$ as the resilient biasing force can be considered as a constant. The resilient biasing force of the spring 34$a$ or 34$b$ is to apply a small displacement upon initial setting to set the pressure compensation valve 33$a$ or 33$b$ in the closed position, so that the downstream pressure of the operating variable restrictor 32$a$ or 32$b$ can be controlled at a constant value somewhat higher than the maximum load pressure. Since the resilient biasing force is adjusted to a practically-ignorable very small value, the pressure compensation valve 33$a$ or 33$b$ is considered to control the downstream pressure $Pz_i$ of the operating variable restrictor 32$a$ or 32$b$ at a value substantially equal to the maximum load pressure Plmax. On the other hand, the delivery pressure Ps of the pump 1 which feeds the pressure oil to the upstream sides of the operating variable restrictors 32$a$,32$b$ is controlled at plmax+ΔPLS, which is higher by the load sensing pressure difference ΔPLS than the maximum load pressure Plmax as shown by the formula (2). This delivery pressure Ps is fed to the branch lines 3$a$,3$b$ and becomes the upstream pressure of the operating variable restrictors 32$a$,32$b$. When the operating variable restrictors 32$a$,32$b$ of the respective flow control units 33$a$,33$b$ have been set at desired restricted openings, the pressure difference $Ps-Pz_i$ between the upstream and downstream pressures of each operating variable restrictor 32$a$ or 32$b$ is maintained at a constant value approximating the load sensing pressure difference ΔPLS in view of the formulas (2) and (10) as indicated by the following formula (11):

$$\begin{aligned} Ps - Pz_i &= (Pl\max + \Delta PLs) - (Pl\max + Co_i) \\ &= \Delta PLs - Co_i \\ &\approx \Delta PLs \end{aligned} \tag{11}$$

Namely, the pressure difference across the operating variable restrictor 32$a$ or 32$b$ is controlled and compensated in pressure by the pressure compensation valve 33$a$ or 33$b$ so that irrespective of the level of the load pressure, the pressure difference is always maintained at a pressure substantially equal to the load sensing pressure difference ΔPLS. As a result, the flow rate $Qv_i'$ through the operating variable restrictor 32$a$ or 32$b$ is defined as follows:

$$Qv_i' = N \cdot A_i \sqrt{(Ps - Pz_i)} \tag{12}$$

$$Qv_i' = N \cdot A_i \sqrt{(\Delta PLs)}$$

The flow rate $Qv_i'$ therefore remains at a value proportional to a restricted opening set by the operating variable restrictor 32$a$ or 32$b$ without being affected by variations in the pressure of the circuit. As long as the restricted opening remains unchanged, the flow rate $Qv_i'$ can be maintained at the constant value.

Since $Co_i$ in the formula (10) is adjusted to take an ignorably small value, the downstream pressure $Pz_i$ of the restrictor group in each flow control unit 30$a$ or 30$b$ is controlled at a level substantially equal to the maximum load pressure plmax. On the other hand, the delivery pressure Ps of the hydraulic pump 1 which feeds the pressure oil to the upstream side of each correcting variable restrictor 31$a$ or 31$b$ is controlled by the load sensing control at Plmax+ΔPLS, which is higher than the maximum load pressure Plmax by the load sensing pressure difference PLs as indicated by the formula (2). This delivery pressure Ps is delivered to each branch line 3$a$ or 3$b$ and becomes the upstream pressures of the correcting variable restrictor 31$a$ or 31*b*. When each operating variable restrictors 32*a* or 32*b* has been set at a desired valve opening, the following formula can be established from the formulas (2) and (10) between the upstream pressure of the correcting variable restrictor 31*a* or 31*b* and the downstream pressure of the operating variable restrictor 32*a* or 32*b*, said correcting variable restrictor and said operating variable restrictor being arranged in series:

$$\begin{aligned} Ps - Pz_i &= (Pl\max + \Delta PLs) - (Pl\max + Co_i) \qquad (13) \\ &= \Delta PLs - Co_i \\ &\approx \Delta PLs \end{aligned}$$

This indicates that the pressure difference $Ps-Pz_i$ is always maintained at a constant value approximating the load sensing pressure difference ΔPLS.

This load sensing pressure difference ΔPLS and the pressure difference $\Delta Po_i$ across each restrictor group consisting of restrictors arranged in series as in this embodiment can be expressed by the pressure difference $\Delta Pv_i$ across the operating variable restrictor 32*a* or 32*b* and the pressure difference $\Delta Pm_i$ across the correcting variable restrictor 31*a* or 31*b* in a similar manner to the above-described formula (4). These pressure differences $\Delta Pv_i$, $\Delta Pm_i$ and the flow rates through the operating variable restrictors 32*a*,32*b* and the correcting variable restrictors 31*a*,31*b* can be expressed similarly to the formulas (6) and (7) described above.

The flow rate $Qv_i$ through each operating variable restrictor 32*a* or 32*b* and the flow rate $Qm_i$ through the corresponding correcting variable restrictor 31*a* or 31*b* are the flow rates of the pressure oil flowing through the same flow passage and are equal to each other. From the formulas (4), (6) and (7) described above, the pressure difference $\Delta Pv_i$ across the operating variable restrictor 32*a* or 32*b* can be expressed similarly to the above-described formula (8) so that the flow rate $Qv_i$ through the operating variable restrictor 32*a* or 32*b* can be derived like the above-described formula (9), that is, can be expressed as follows:

$$\begin{aligned} Qv_i &= N \cdot A_i \sqrt{(\Delta Pv_i)} \qquad (14) \\ &= N \cdot A_i \sqrt{\{X_i^2/(1+X_i^2) \cdot \Delta PLs\}} \\ &= \sqrt{\{X_i^2/(1+X_i^2)\}} \cdot N \cdot A_i \sqrt{(\Delta PLs)} \\ &= \sqrt{\{X_i^2/(1+X_i^2)\}} \cdot Qv_i' \end{aligned}$$

The characteristics of the pressure difference $\Delta PV_i$ across the operating variable restrictor 32*a* or 32*b* in each flow control unit 30*a*,30*b* of the fourth embodiment can also be illustrated as in FIG. 6 similarly to the first embodiment.

In all the flow control units 6*a*,6*b*;30*a*,30*b* in the first and fourth embodiments, the opening area ratios $X_i$ become smaller and the pressure differences across the operating variable restrictors 11*a*,11*b*;31*a*, 31*b* becomes smaller as the stroke of the control lever, in other words, the valve openings of the operating variable restrictors 11*a*,11*b*;32*a*, 32*b* increase, provided that the restricted openings of the correcting variable restrictors 10*a*,10*b*;31*a*,31*b* are constant. This however does not mean that each flow rate decreases as the stroke of the control lever increases. It is meant that although each flow rate increases with the stroke of the control lever, the flow rate does not increase proportionally in response to the stroke but the flow rate increases with the percent increment relative to the stroke being limited. When the stroke of the control lever is increased with the restricted openings of the correcting variable restrictors 10*a*,10*b*;31*a*, 31*b* being kept constant, the pressure differences across the operating variable restrictors 11*a*,11*b*;32*a*,32*b* become smaller in accordance with the stroke so that the flow rates therethrough do not necessarily increase in proportion to the stroke of the control lever. As is appreciated from FIG. 6, however, a variation in the pressure difference across each restrictor per unit stroke of the control lever is relatively small in a range where the opening area ratio $X_i$ is greater than a predetermined value (for example, 2 in FIG. 6). In such a range, the drive speed of each actuators 5*a* or 5*b* varies substantially in proportion to a stroke of the control lever, so that no particular problem or inconvenience arises in the feeling of operation during standard work by a hydraulic work vehicle. In a range where the opening area ratio $X_i$ is relatively smaller than the predetermined value, on the other hand, the pressure difference across each restrictor varies at a relatively greater rate. The flow rate however increases at a progressively increasing, limited percent increment as the stroke becomes greater. The drive speed of each actuator 5*a* or 5*b* can therefore be prevented from suddenly increasing even when the stroke of the control level is increased. Setting aside the question of whether the flow control system is suited for such work as placing importance on efficiency, appropriate use of these characteristics hence make it possible to use the flow control system conveniently for other work.

Fifth Embodiment

Figure 5:
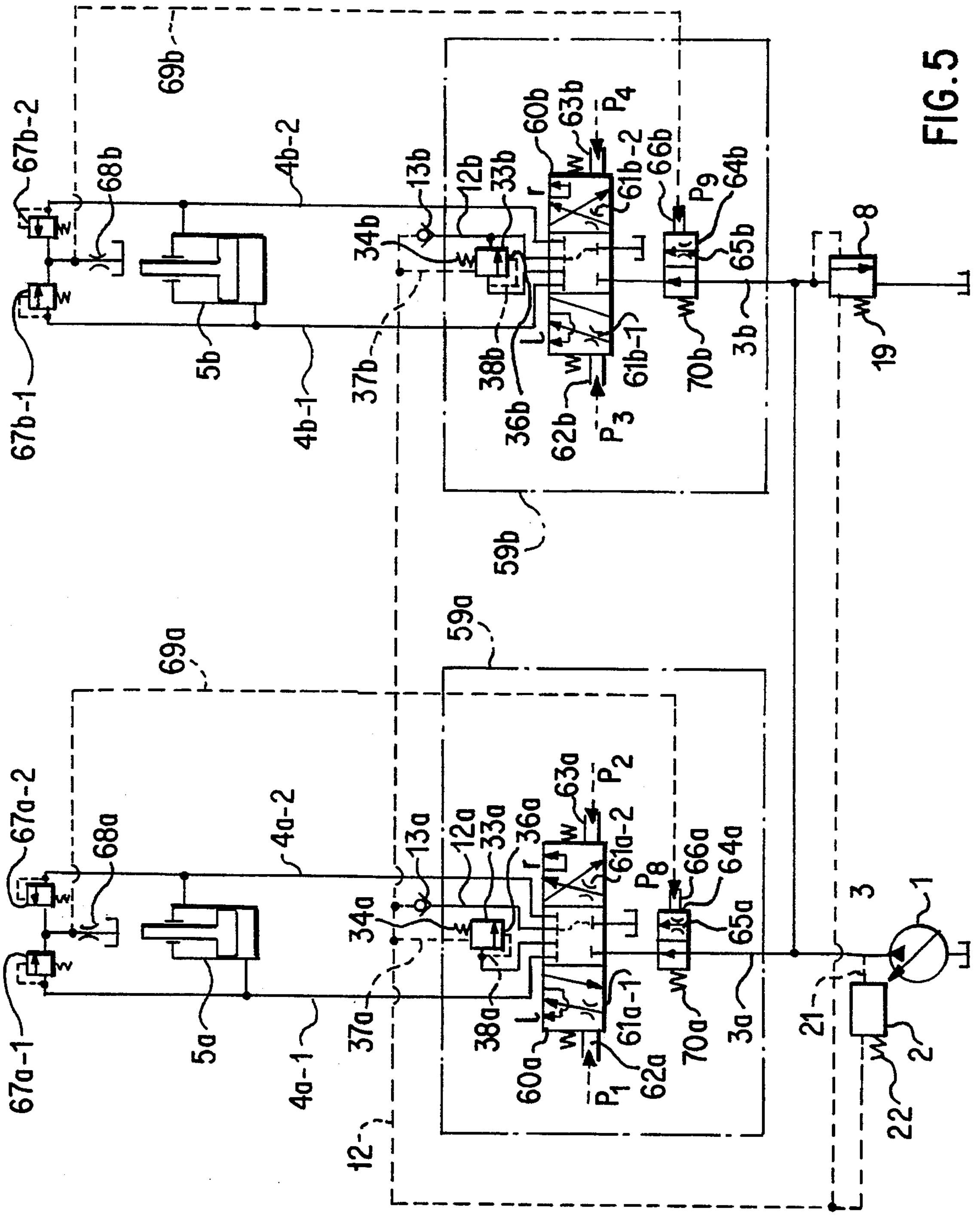
FIG. 5 is a hydraulic circuit for load sensing control, which is equipped with a flow control system according to a fifth embodiment of the present invention.

The hydraulic circuit according to the fifth embodiment is depicted in FIG. 5. This emboidment is characterized in that in the fourth embodiment described above, the load lines 4*a*-1,4*a*-2;4*b*-1,4*b*-2 are arranged in association with the first and second actuators 5*a*,5*b*, respectively, the driving directions and drive speeds of the actuators 5*a*,5*b* are controllable by the directional control valves 41*a*,41*b* and, upon actuation of overload relief valves, the pressure differences across the operating variable restrictors can be corrected by the corresponding correcting variable restrictors. As the other elements are constructed as in the fourth embodiment, like elements are therefore identified by like reference numerals, and only the different elements will be described.

In FIG. 5, the load lines 4a-1,4b-1 are connected to the bottom sides of the first and second actuators 5*a*,5*b* and the load lines 4a-2,4b-2 are connected to their rod sides, respectively. The load lines 4a-1,4a-2 are connected to a first directional control valve 60*a*, while the load lines 4b-1,4b-2 are connected to a second directional control valve 60*b*. The first and second directional control valves 60*a*,60*b* are each connected to an unillustrated hydraulic pilot pressure device. To the pilot terminals 62*a*,63*a* of the first directional control valve 60*a*, pilot pressures $P_1$,$P_2$ are fed from the hydraulic pilot pressure device which has been operated by an unillustrated control lever, whereby the directional control valve 60*a* is controlled in the switching of its direction and the opening. Likewise, pilot pressures $P_3$,$P_4$ are fed to pilot terminals 62*b*,63*b* of the second directional control valve 60*b* from the hydraulic pilot pressure device which has been operated by the unillustrated control lever, so that the directional control valve 60*b* is controlled in the switching of its direction and the opening.

The directional control valves 60*a*,60*b* are internally provided with operating variable restrictors 61a-1,61a-2;61b-1,61b-2 having similar functions to the operating variable restrictors in the fourth embodiment described above. When the control lever of the unillustrated hydraulic pilot pressure device is operated in a direction to displace a piston rod of the actuator 5a in an advancing direction, the directional control valve 60a is switched by the pilot pressure $P_1$ to a left position from a center valve position as viewed in the drawing. When the control lever is operated in a direction to displace the piston rod of the actuator in a retreating direction, the directional control valve 60a is switched by the pilot pressure $P_2$ to a right position from the center valve position. When the control lever is operated in a direction to displace a piston rod of the actuator 5b in an advancing direction, the directional control valve 60b is similarly switched by the pilot pressure $P_3$ to a left position from a center valve position as viewed in the drawing. When the control lever is operated in a direction to displace the piston rod of the actuator in a retreating direction, the directional control valve 60b is switched by the pilot pressure $P_4$ to a right position from the center valve position. When switched to the left positions, the first and second directional control valves 60a,60b feed pressure oils to the bottom sides of the respective actuators 5a,5b from the load lines 4a-1,4b-1 via the operating variable restrictors 61a-1, 61b-1 and the first and second pressure compensation valves 36a,36b and at the same time, communicate the other load lines 4a-2,4b-2 to their corresponding tank ports to release the pressure oils from the rod sides of the respective actuators 5a,5b. Accordingly, the actuators 5a,5b are driven upwards. When switched to the right positions, on the other hand, the first and second directional control valves 60a,60b feed the pressure oil from the load lines 4a-2,4b-2 to the rod sides of the actuators 5a,5b via the operating variable restrictors 61a-2,61b-2 and at the same time, communicate the other load lines 4a-1,4b-1 to their corresponding tank ports to release the pressure oils from the bottom sides of the respective actuators 5a,5b. Accordingly, the actuators 5a,5b are driven downwards. At this time, spools of the directional control valves 60a,60b are controlled, like the second embodiment, in displacement according to the values of the pilot pressures $P_1$,$P_2$,$P_3$,$P_4$ outputted from the hydraulic pilot pressure device, namely, the stroke of the control lever, whereby the restricted openings of the variable restrictors 61a-1,61a-2;61b-1,61b-2 are set.

A first and second flow control valves 64a,64b are arranged in the first and second branch lines 3a,3b on the upstream sides of the first and second directional control valves 60a,60b, so that the rates of flows to the directional control valves 60a,60b can be controlled. The flow control valves 64a,64b are provided at one ports thereof with a first and second correcting variable restrictors 65a,65b, respectively, whereby the pressure differences across the operating variable restrictors 61a-1,61a-2;61b-1,61b-2 of the directional control valves 60a,60b can be corrected. Opposite ports are formed fully open so that the pressure oils can be fed to the directional control valves 60a,60b, respectively. Further, the load lines 4a-1,4a-2;4b-1,4b-2 are provided with overload relief valves 67a-1,67a-2;67b-1,67b-2, a first restrictor 68a arranged in a discharge line from the overload relief valves 67a-1,67a-2, and a second restrictor 68b arranged in a discharge line from the overload relief valves 67b-1,67b-2. Upstream pressures of these restrictors 68a, 68b are connected to pilot terminals 66a,66b of the one ports of the first and second flow control valves 64a,64b through pilot lines 69a,69b. Accordingly, pilot pressures $P_8$,$P_9$ are guided to the pilot terminals 66a,66b. Depending on the balancing in drive force between the pilot pressures $P_8$,$P_9$ and the spring forces of the springs 70a,70b attached to the other ports to specify the initial setting pressures, the spools of the flow control valves 64a,64b are displaced to set the restricted openings of the variable restrictors 65a,65b.

When constructed as described above, it is possible to drive the actuators 5a,5b in both directions while still being equipped with functions similar to the fourth embodiment. Moreover, when the overload relief valves 67a-1,67a-2;67b-1,67b-2 are actuated, the openings of the correcting variable restrictors 65a,65b are set in accordance with the pressures of the pressure oils discharged from the overload relief valves 67a-1,67a-2;67b-1,67b-2 so that the pressure differences across the operating variable restrictors 61a-1,61a-2;61b-1,61b-2 are reduced. The actuators 5a,5b are therefore driven at speeds corresponding to the openings of the operating variables restrictors 61a-1,61a-2;61b-1,61b-2, which openings are determined based on the pressure differences corrected by the correcting variable restrictors 65a,65b. In addition, the flow rates of the pressure oils fed through the correcting variables restrictors 65a,65b are limited as described above. Obviously, the pressure oils to be fed to the load lines 4a-1,4a-2;4b-1,4b-2 are also limited, thereby making it possible to reduce the relief losses. Other elements not described specifically above are constructed as in the fourth embodiment and operate likewise.

In the flow control units 6a,6b;40a;40a,40b; 30a,30b;59a, 59b in all the first to fifth embodiments described above, the correcting variable restrictors 10a,10b;47a;47a,47b;31a, 31b;65a, 65b are arranged on the upstream sides of the operating variable restrictors 11a,11b;44a-1,44a-2;44a-1, 44a-2,44b-1,44b-2;32a,32b;61a-1,61a-2,61b-1,61b-2. As already described with respect to the first embodiment, it is clear that these restrictors exhibit similar effect even when their positional relationships are reversed. In essence, it is sufficient insofar as the arrangements of the pressure compensation valves 9a,9b;33a,33b relative to the restrictor groups consisting of these operating variable restrictors 11a,11b;44a-1,44a-2;44a-1,44a-2,44b-1,44b-2;32a, 32b;61a-1,61a-2,61b-1,61b-2 and these correcting variable restrictors 10a,10b;47a;47a,47b;31a,31b;65a,65b are specified corresponding to the systems according to the individual embodiments. In these embodiments, the correcting variable restrictors 10a,10b;47a;47a,47b;31a, 31b;65a,65b are singly arranged as means for correcting the pressure differences across the operating variable restrictors 11a,11b;44a-1,44a-2;44a-1,44a-2,44b-1,44b-2;32a, 32b;61a-2,61b-1,61b-2. It is also possible to arrange other variable restrictors or fixed restrictors in addition to these correcting variable restrictors so that the operating variable restrictors are each provided with plural correcting restrictors. In this case, the pressure differences across the operating variable restrictors 11a, 11b;44a-1,44a-2;44a-1,44a-2,44b-1, 44b-2;32a,32b; 61a-1, 61a-2,61b-1,61b-2 are each corrected solely relying upon the corresponding plural restrictors. It is therefore evident that such modified embodiments can surely provide both large flow rates and limited flow rates like the above-described embodiments while permitting modifications to their fixed flow rate characteristics, although these flow rates may differ in extent from those available from the above-described embodiments.

The above-described embodiments, when applying a control force to each pressure compensation valve, adopt the so-called hydraulic pilot control method that an upstream pressure of a corresponding restrictor group, a downstream pressure of the restrictor group and a maximum load pressure are introduced as pilot pressures. Based on these pressures, a control force can also be applied by the solenoid-operated pilot control method or the solenoid-operated control method. In essence, no particular limitation is imposed on the control method insofar as a control force is applied to each pressure compensation valve on the basis of an upstream pressure of a corresponding restrictor group, a downstream pressure of the restrictor group and a maximum load pressure. Further, a spring is employed to preset each pressure compensation valve in the embodiments described above. This objective can also be achieved similarly by using a hydraulic pilot pressure or the like. In essence, no particular limitation is imposed in this regard insofar as each pressure compensation valve is provided with means for applying thereto a desired drive force upon initial setting.

What is claimed is:

1. A flow control system arranged in a hydraulic circuit provided with a variabled displacement hydraulic pump, plural actuators driven by pressure oil fed from said hydraulic pump and pump control means for controlling the displacement of said hydraulic pump so that a delivery pressure of said hydraulic pump becomes higher by a predetermined value than a maximum load pressure to said plural actuators, whereby the flow rate of the pressure oil to be fed to said actuators is controlled, comprising:

plural valve means connected between said hydraulic pump and said actuators, respectively, each of said plural valve means having an operating variable restrictor, whose opening can be varied by control means to control the flow rate of the pressure oil to be fed to the corresponding actuator, and a correcting variable restrictor for correcting a pressure difference across said operating variable restrictor; and pressure compensation valves arranged on upstream sides as viewed in pressure oil feeding directions of restrictor groups disposed corresponding to said actuators and having said operating variable restrictors and said correcting variable restrictors, respectively, the opening of each of said pressure compensation valves being independently set by a drive force in an opening direction based on a downstream pressure of the corresponding restrictor group, a drive force in the opening direction set by pressure-difference setting means and a drive force in a closing direction based on an upstream pressure of the corresponding restrictor group so that the upstream pressure of the corresponding group becomes higher by a predetermined pressure than the downstream pressure of the corresponding restrictor group.

2. A flow control system arranged in a hydraulic circuit provided with a variable displacement hydraulic pump, plural actuators driven by pressure oil fed from said hydraulic pump and pump control means for controlling the displacement of said hydraulic pump so that a delivery pressure of said hydraulic pump becomes higher by a predetermined value than a maximum load pressure to said plural actuators, whereby the flow rate of the pressure oil to be fed to said actuators is controlled, comprising:

plural valve means connected between said hydraulic pump and said actuators, respectively, each of said plural valve means having an operating variable restrictor whose opening can be varied by control means to control the flow rate of the pressure oil to be fed to the corresponding actuator;

pressure compensation valves arranged on upstream sides as viewed in pressure oil feeding directions of restrictor groups disposed corresponding to said actuators and having said operating variable restrictors, respectively, the opening of each of said pressure compensation valves being independently set by a drive force in an opening direction based on a downstream pressure of the corresponding restrictor group, a drive force in the opening direction set by pressure-difference setting means and a drive force in a closing direction based on an upstream pressure of the corresponding restrictor group so that the upstream pressure of the corresponding restrictor group becomes higher by a predetermined pressure than the downstream pressure of the corresponding restrictor group; and a correcting variable restrictor arranged on a downstream side as viewed in pressure oil feeding direction of the pressure compensation valve in a hydraulic drive route for driving at least one of said actuators and on an upstream side as viewed in pressure oil feeding direction of the corresponding operating variable restrictor, whereby a pressure difference across said operating variable restrictor is corrected.

3. A flow control system according to claim 2, wherein said correcting variable restrictor corresponding to said at least one actuator is fed with an opening control signal from control means for the operating variable restrictor arranged in a hydraulic drive route for the actuator not provided with said correcting variable restrictor, and the restricted opening of said correcting variable restrictor is changed in accordance with the opening control signal.

4. A flow control system according to claim 3, wherein the opening control signal from said control means is a pilot pressure for regulating the opening of said correcting variable restrictor, and said correcting variable restrictor is set to have a smaller opening as the pilot pressure becomes higher.

5. A flow control system according to claim 2, further comprising restricted opening setting means for setting the restricted opening of said correcting variable restrictor, said restricted opening setting means setting the restricted opening of said correcting variable restrictor independently from the restricted opening of said operating variable restrictor.

6. A flow control system according to claim 5, wherein said restricted opening setting means comprises a solenoid-operated proportional pressure reducing valve for setting a pilot pressure which is in turn used to set the restricted opening of said correcting variable restrictor, means for indicating the degree of a reduction in pressure to said solenoid-operated proportional pressure reducing valve, and a controller for controlling the opening of said solenoid-operated proportional pressure reducing valve in accordance with the degree of the reduction in pressure from said indicating means.

7. A flow control system arranged in a hydraulic circuit provided with a variable displacement hydraulic pump, plural actuators driven by pressure oil fed from said hydraulic pump and pump control means for controlling the displacement of said hydraulic pump so that a delivery pressure of said hydraulic pump becomes higher by a predetermined value than a maximum load pressure of said plural actuators, whereby the flow rate of the pressure oil to be fed to said actuators is controlled, comprising:

plural valve means connected between said hydraulic pump and said actuators, respectively, each of said plural valve means having an operating variable restrictor, whose opening can be varied by control means to control the flow rate of the pressure oil to be fed to the corresponding actuator, and a correcting variable restrictor for correcting a pressure difference across said operating variable restrictor; and pressure compensation valves arranged on downstream sides as viewed in pressure oil feeding directions of restrictor groups disposed corresponding to said actuators and having said operating variable restrictors and said correcting variable restrictors, respectively, the opening of each of said pressure compensation valves being independently set by a drive force in a closing direction based on a maximum load pressure to the corresponding actuator, a drive force in the closing direction for initial setting and a drive force in an opening direction based on a downstream pressure of the corresponding restrictor group so that the downstream pressure of the corresponding restrictor group has a constant value sufficient to drive the corresponding actuator under the maximum load pressure.

8. A flow control system according to claim 7, further comprising overload relief valves connected to load lines of said respective actuators, restrictors arranged in discharge lines from said respective overload relief valves to a tank, and pilot lines connected to downstream sides of said respective overload relief valves to apply drive forces in closing directions to said respective correcting variable restrictors.

9. A flow control system according to any one of claims 1, 2, 3 and 7, wherein said operating variable restrictors are arranged in flow passages of directional control valves for driving said respective actuators in both normal and reversed directions.

10. A flow control system according to any one of claims 1 to 3, wherein said actuators are actuators of a hydraulic work vehicle and said operating variable restrictors are operated by a control lever of said hydraulic work vehicle.

* * * * *